(12) United States Patent
Shukla et al.

(10) Patent No.: US 8,383,254 B2
(45) Date of Patent: Feb. 26, 2013

(54) METHOD OF PRODUCING SELF-ASSEMBLED CUBIC FEPT NANOPARTICLES AND APPARATUS USING SAME

(75) Inventors: Nisha Shukla, Pittsburgh, PA (US); Timothy John Klemmer, Pittsburgh, PA (US); Dieter Klaus Weller, San Jose, CA (US); Chao Liu, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 12/891,838

(22) Filed: Sep. 28, 2010
(Under 37 CFR 1.47)

(65) Prior Publication Data

US 2011/0086195 A1   Apr. 14, 2011

Related U.S. Application Data

(62) Division of application No. 11/481,388, filed on Jul. 5, 2006, now Pat. No. 7,807,217.

(51) Int. Cl.
*G11B 5/65* (2006.01)

(52) U.S. Cl. ............ 428/827; 428/829; 428/836.1

(58) Field of Classification Search ............ None
See application file for complete search history.

(56) References Cited

U.S. PATENT DOCUMENTS

| | | | |
|---|---|---|---|
| 6,162,532 A * | 12/2000 | Black et al. | 428/323 |
| 6,719,841 B2 | 4/2004 | Chen et al. | |
| 6,805,904 B2 * | 10/2004 | Anders et al. | 427/203 |
| 6,838,195 B2 * | 1/2005 | Weller et al. | 428/842.2 |
| 6,893,886 B2 | 5/2005 | Liu et al. | |
| 7,029,773 B2 * | 4/2006 | van de Veerdonk et al. | 428/836 |
| 7,041,394 B2 * | 5/2006 | Weller et al. | 428/836 |
| 7,153,597 B2 * | 12/2006 | Yang et al. | 428/836 |
| 7,229,709 B2 * | 6/2007 | Tsuchiya et al. | 428/842.2 |
| 7,808,217 B2 * | 10/2010 | de Cremoux et al. | 323/222 |
| 2002/0028357 A1 * | 3/2002 | Shukh et al. | 428/694 TM |
| 2003/0228499 A1 * | 12/2003 | Maeda et al. | 428/695 |
| 2006/0070491 A1 | 4/2006 | Yang et al. | |
| 2006/0153976 A1 * | 7/2006 | Ito et al. | 427/127 |
| 2006/0222896 A1 * | 10/2006 | Inomata et al. | 428/826 |
| 2007/0190365 A1 * | 8/2007 | Kodama et al. | 428/832 |
| 2009/0061106 A1 * | 3/2009 | Ihara et al. | 427/548 |
| 2009/0155630 A1 * | 6/2009 | Momose et al. | 428/835 |

OTHER PUBLICATIONS

Zeng et al. ("Magnetic properties of self-assembled Co nanowires of varying length and diameter", J. App. Phys., 87(9), 2000, 4718-4720).*
Zeng et al. ("Shape-Controlled Synthesis and Shape-Induced Texture of MnFe2O4 Nanoparticles", J. Am. Chem. Soc., 126, 2004, 11458-11459).*
Thurn-Albrecht et al. ("Ultrahigh-Density Nanowire Arrays Grown in Self-Assembled Diblock Copolymer Templates", Science, 290, 2004, 2126-2129).*
Bian et al. ("Fabrication and nanostructure of oriented FePt particles", J. App. Phys., 87(9), 2000, 6962-6964).*
Shukla et al. ("Oriented self-assembly of cubic FePt nanoparticles", Mat. Let., 60, 2006, 995-998).*

(Continued)

*Primary Examiner* — Kevin Bernatz
(74) *Attorney, Agent, or Firm* — Hollingsworth Davis, LLC (57) ABSTRACT

An apparatus includes a substrate, a magnetically soft underlayer on the substrate, and a plurality of generally cubic FePt nanoparticles on the magnetically soft underlayer, wherein the nanoparticles have a magnetization in a direction substantially normal to a surface of the magnetically soft underlayer. The FePt nanoparticles can have magnetically easy axes perpendicular to the surface of the soft underlayer.

20 Claims, 8 Drawing Sheets

OTHER PUBLICATIONS

L. Tang et al., "Electron Diffraction Patterns of Fibrous and Lamellar Textured Polycrystalline Thin Films. I. Theory", J. Appl. Cryst. (1996), vol. 29, pp. 411-418.

S. Sun et al., "Monodisperse FePt Nanoparticles and Ferromagnetic FePt Nanocrystal Superlattices", Science, vol. 287, Mar. 17, 2000, pp. 1989-1992.

B. Bian et al., "Fabrication and Nanostructure of Oriented FePt Particles", J. of Applied Physics, vol. 87, No. 9, May 1, 2000, pp. 6962-6964.

B. Bian et al., "Synthesis and Structure of Isolated $L1_0$ FePt Particles", IEEE Trans. on Magnetics, vol. 36, No. 5, Sep. 2000, pp. 3021-3023.

S. Jeong et al., "Magnetic Properties of Nanostructured CoPt and FePt Thin Films", IEEE Trans. on Magnetics, vol. 36, No. 5, Sep. 2000, pp. 2336-2338.

Z. R. Dai et al., "Phase Transformation, Coalescence, and Twinning of Monodisperse FePt Nanocrystals", Nano Letters, 2001, vol. 1, No. 8, pp. 443-447.

C. B. Murray et al., "Colloidal Synthesis of Nanocrystals and Nanocrystal Superlattices," IBM J. Res. & Dev., vol. 45, No. 1, Jan. 2001, pp. 47-56.

S. Sun et al., "Compositionally Controlled FePt Nanoparticle Materials", IEEE Trans. on Magnetics, vol. 37, No. 4, Jul. 2001, pp. 1239-1243.

H. Zeng et al., "Interparticle Interactions in Annealed FePt Nanoparticle Assemblies", IEEE Trans. on Magnetics, vol. 38, No. 5, Sep. 2002, pp. 2598-2600.

T. J. Klemmer et al., "Structural Studies of $L1_0$ FePt Nanoparticles", Applied Physics Letters, vol. 81, No. 12, Sep. 16, 2002, pp. 2220-2222.

K. Liu et al., "Fabrication and Thermal Stability of Arrays of Fe Nanodots", Applied Physics Letters, vol. 81, No. 23, Dec. 2, 2002, pp. 4434-4436.

H. S. Ko et al., "Fine Control of $L1_0$ Ordering and Grain Growth Kinetics by C Doping in FePt Films", Applied Physics Letters, vol. 82, No. 14, Apr. 7, 2003, pp. 2311-2313.

K. Kang et al., "(001) Oriented FePt-Ag Composite Nanogranular Films on Amorphous Substrate", Applied Physics Letters, vol. 82, No. 19, May 12, 2003, pp. 3284-3286.

X. W. Wu et al., "Studies of Switching Field and Thermal Energy Barrier Distributions in a FePt Nanoparticle System", J. of Applied Physics, vol. 93, No. 10, May 15, 2003, pp. 7181-7183.

C. Liu et al., "Oxidation of FePt Nanoparticles", Journal of Magnetism and Magnetic Materials, vol. 266, (2003), pp. 96-101.

T. J. Klemmer et al., "Combined Reactions Associated With $L1_0$ Ordering", Journal of Magnetism and Magnetic Materials, vol. 266, (2003), pp. 79-87.

M. Tanase et al., "Crystallographic Ordering Studies of FePt Nanoparticles by HREM", Journal of Magnetism and Magnetic Materials, vol. 266, (2003), pp. 215-226.

C. Liu et al., "Polyol Process Synthesis of Monodispersed FePt Nanoparticles", The Journal of Physical Chemistry B, Letters, vol. 108, No. 20, May 20, 2004, pp. 6121-6123.

H. Kodama et al., "Chemically Synthesized FePt Nanoparticle Material for Ultrahigh-Density Recording", IEEE Trans. on Magnetics, vol. 41, No. 2, Feb. 2005, pp. 665-669.

Y. Sasaki et al., "Chemically Synthesized $L1_0$-Type FePt Nanoparticles and Nanoparticle Arrays Via Template-Assisted Self-Assembly", IEEE Trans. on Magnetics, vol. 41, No. 2, Feb. 2005, pp. 660-664.

D. J. Sellmyer et al., "High-Anisotropy Nanocluster Films for High-Density Perpendicular Recording", IEEE Trans. on Magnetics, vol. 41, No. 2, Feb. 2005, pp. 560-565.

H. Ito et al., "Control of the Size for Octahedral FePt Nanoparticles and Their Magnetic Properties", IEEE Trans. on Magnetics, vol. 41, No. 10, Oct. 2005, pp. 3373-3375.

C. Liu et al., "Reduction of Sintering During Annealing of FePt Nanoparticles Coated With Iron Oxide", Chem. Mater., (2005), vol. 17, pp. 620-625.

Y. Peng et al., "$L1_0$ FePt-MgO Perpendicular Thin Film Deposited by Alternating Sputtering at Elevated Temperature", J. of Applied Physics, vol. 99, (2006), pp. 1-3.

N. Shukla et al., "Oriented Self-Assembly of Cubic FePt Nanoparticles", Materials Letters, vol. 60, (2006), pp. 995-998.

Min Chen et al., "Patterning Self-Assembled FePt Nanoparticles" Journal of Magnetic Materials 266 (2008) 8-11.

\* cited by examiner

METHOD OF PRODUCING SELF-ASSEMBLED CUBIC FEPT NANOPARTICLES AND APPARATUS USING SAME

CROSS REFERENCE TO RELATED APPLICATION

This application is a divisional application of U.S. patent application Ser. No. 11/481,388, filed Jul. 5, 2006, and titled "Method Of Producing Self-Assembled Cubic FePt Nanoparticles And Apparatus Using Same", which is hereby incorporated by reference.

FIELD OF THE INVENTION

This invention relates to methods for making cubic FePt nanoparticles, and to magnetic recording media that includes the FePt nanoparticles.

BACKGROUND OF THE INVENTION

Synthesis and self-assembly of FePt nanoparticles have been of great interest to the data storage industry as a possible means for making nanoparticle-based magnetic media which can enable recording densities beyond 1 Tbit/in$^2$. The magnetic bits, which record data in conventional thin film magnetic media, are comprised of many grains. In order to achieve high recording densities with bits having well-defined shapes and boundaries, it is necessary to reduce the so-called transition jitter, which is the dominant noise source in today's media. This is usually accomplished by decreasing the size of the grains such that they remain significantly smaller than the bit size. If the grains become too small, however, thermal fluctuations may cause individual grains to switch randomly, thereby destroying the bit information over time. To avoid that problem, hard magnetic materials systems such as $L1_0$ phases or high anisotropy rare-earth transition metal systems are being developed, allowing small grains to remain thermally stable. FePt is the most prominent $L1_0$ candidate material for this approach. See for example D. Weller and A. Moser, IEEE Transactions on Magnetics, Vol. 35, pp. 4423-4439 (1999). A big limitation of these materials is that typical synthesis methods produce a face centered cubic (fcc), low magnetocrystalline phase and not the desired high anisotropy $L1_0$ phase. Thus the films must be subjected to post synthesis annealing to induce a phase transformation from fcc to $L1_0$.

Self-assembled arrays of FePt $L1_0$ nanoparticles can, in principle, reduce transition jitter by having uniformly sized magnetic grains separated by a well-defined matrix. Jitter is the noise in the magnetic signal from the media that arises from the poorly defined boundary of the magnetic bit formed by randomly shaped and randomly sized magnetic grains. Thus the ideal magnetic media would be formed of nanoparticles that are of uniform, small size, are packed into arrays with the highest possible density, and have uniform, e.g., perpendicular magnetic orientation.

Figure 7:
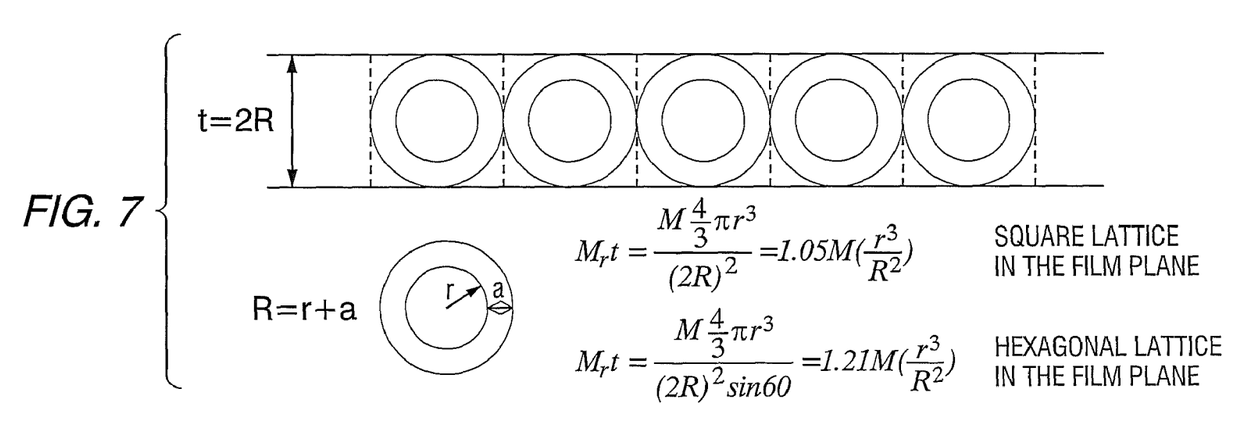
FIG. 7 is a schematic representation of a lattice including spherical particles.
Figure 8:
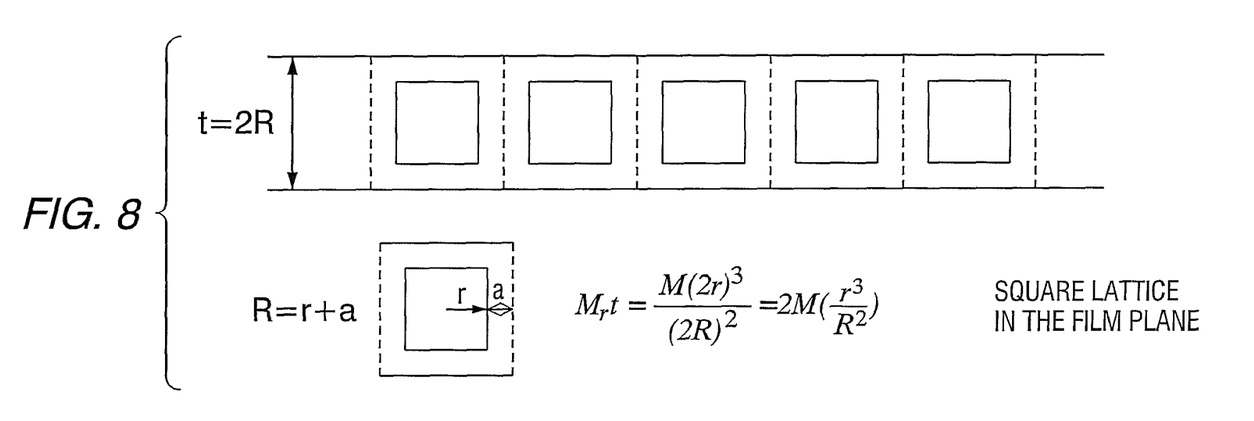
FIG. 8 is a schematic representation of a lattice including cubic particles.

Chemical syntheses have been developed that produce nearly spherical FePt nanoparticles that are highly monodispersed with uniform diameters of 3-4 nm. Various methods of chemical synthesis of FePt nanoparticles are known. These syntheses produce spherical nanoparticles coated with films of oleic acid and oleylamine surfactants that are ~2 nm thick. One of the disadvantages of these small spherical nanoparticles is that they have low magnetic moment per unit area requiring very sensitive read heads to detect the recorded bits. A typical parameter used to describe the average signal from the media is the $M_r t$. Here $M_r$ is the remanent magnetization and t is the thickness of the media. FIGS. 7 and 8 show calculations for the $M_r t$ for spherical particles self-assembled on square and hexagonal lattices and cubes self-assembled on a square lattice. Taken into consideration is a region of 'non-magnetic' material surrounding the particles with a thickness of 'a', which may represent surfactant, oxides, other nonmagnetic metals and/or space. The $M_r t$ for all these structures are shown to be $\sim kM_r r^3/R^2$ where $M_r$ is the remanent magnetization and r and R are geometrically described in the figure. Notice that the constant k depends on the shape of the particles and the lattice in which they are placed. Here k=1.05 for spheres on a square lattice, k=1.21 for spheres on a hexagonal lattice, and k=2 for cubes on a square lattice. Clearly self-assembled spherical particles give relatively lower $M_r t$ as compared to cubic particles with similar dimensions.

A more critical problem with spherical particles is the fact that the magnetic axes of the particles are difficult to align once deposited on a surface. Others have reported the fabrication of oriented FePt nanoparticles with high coercivity but these nanoparticles were fabricated by electron beam evaporation and grown epitaxially on MgO(001) and NaCl(001) surfaces. Increasing the packing fraction and obtaining alignment of the magnetic axis are both crucial for utilization of chemically synthesized FePt nanoparticles in high density recording media.

Synthesis of cubic nanoparticles has been reported in the literature for various metals and alloys, including monodispersed silver nanocubes with edge length of 55 nm, cubic PbTe nanoparticles, and cubic PbSe nanoparticles for use as quantum dots. The formation of core shell cubic FePt/$Fe_3O_4$ nanoparticles has been reported, but showed no net orientation or long range self-assembly of these nanoparticles when deposited on substrates. Chemical synthesis of cubic FePt nanoparticles was reported by H. Zeng et al. [J. Am. Chem. Soc. 126, 11458 (2004)].

Self-assembled magnetic nanoparticle arrays are described in U.S. Pat. No. 7,041,394 B2, the disclosure of which is hereby incorporated by reference.

It would be desirable to have a magnetic storage media that includes nanoparticles having uniformly oriented magnetic axes and long range self-assembly.

SUMMARY OF THE INVENTION

In one aspect, the invention provides an apparatus including a substrate, a magnetically soft underlayer on the substrate, and a plurality of generally cubic FePt nanoparticles on the magnetically soft underlayer, wherein the nanoparticles have a magnetization in a direction substantially normal to a surface of the magnetically soft underlayer.

In another aspect, the invention provides an apparatus including a plurality of generally cubic FePt nanoparticles arranged in a pattern on a magnetically soft underlayer, wherein the generally cubic shaped FePt nanoparticles have facets parallel to (001) crystalline planes and have magnetically easy [100] axes perpendicular to the surface of the magnetically soft underlayer.

DETAILED DESCRIPTION OF THE INVENTION

Storage media that includes FePt nanocubes may overcome several of the obstacles associated with the development of magnetic data storage media based on self-oriented magnetic arrays of FePt nanoparticles.

Chemically synthesized FePt nanoparticles have potential for application as magnetic media for data storage. In order to be used as data storage media, however, they must be deposited on substrates in such a way that their magnetic axes are aligned with respect to one another and with respect to the substrate, a problem that has yet to be overcome with spherical FePt nanoparticles.

In a first aspect, this invention provides a method for synthesizing single crystalline FePt nanoparticles with cubic shapes and with the facets of the cube parallel to the (001) type crystallographic planes. The synthesis yields particles with shapes that are close to cubic or rectangular. When deposited on surfaces, these particles assemble with local order and a square lattice. More importantly, the nanoparticles orient themselves with their [100] axes perpendicular to the surface on which they are positioned, and with local interparticle alignment of the [010] and [001] axes oriented parallel to the surface. This occurs because the cube is in a stable position when the cube is flat on a substrate and in a metastable position when the cube is on edge.

The method includes a solution for the chemical synthesis of crystalline FePt nanoparticles with shapes that are close to rectangular and cubic. When deposited onto surfaces from solution, a physical shape anisotropy causes these FePt nanocubes to assemble with oriented crystallographic axes. The FePt nanocubes range from 4 nm to 10 nm in size and assemble into arrays that are locally square, and thus have higher $M_r t$ values than spherical FePt nanoparticles. Thus, this invention provides progress in two of the directions critical to the successful development of magnetic recording media based on FePt nanoparticles.

In one example of the method, the synthesis of FePt nanoparticles was performed under nitrogen in a glove box using iron pentacarbonyl [$Fe(CO)_5$], and platinum acetylacetonate as sources of Fe and Pt, respectively. In this synthesis Fe generated by decomposition of $Fe(CO)_5$, is used as a reducing agent for platinum (II) acetylacetonate. A solution of platinum (II) acetylacetonate (0.5 mmol), $Fe(CO)_5$, (0.5 mmol), oleic acid (4 mmol), and oleylamine (4 mmol) in dichlorobenzene was heated at 4° C. per minute until the reflux temperature of 170° C. was achieved. The heating rate and the reaction temperature are both significantly lower than those used in the standard synthesis with dioctyl ether. The reaction mixture was then refluxed at 170° C. for 24 hours. This synthesis generates a colloidal solution of FePt nanoparticles coated with a layer of mixed oleic acid and oleylamine. The colloidal solution was washed using a known standard process to remove the smallest particles. The final solution of FePt nanoparticles was a 50:50 mixture of hexane and octane with only oleic acid as an excess surfactant in the solution, where the hexane and octane are solvents used to redisperse FePt particles after the wash process. This solution of nanoparticles was then used to deposit the particles on carbon-coated transmission electron microscopy (TEM) grids for subsequent imaging and analysis.

The FePt nanoparticles were self-assembled by placing a drop of the solution onto carbon-coated copper TEM grids and allowing the solvent to dry. The concentration of FePt nanoparticles was approximately 2 mg/ml. TEM imaging and selected area electron diffraction of FePt self-assembled films were performed using a Philips EM420T microscope operating at 120 keV. All chemicals used during the process of synthesis and washing of FePt nanoparticles were bought from Aldrich and Strem chemicals. Platinum acetylacetonate (99.99%), oleic acid (90%), oleylamine (70%), $Fe(CO)_5$ (99%), and dichlorobenzene (99%) were used as obtained, without further purification. Anhydrous ethyl alcohol and hexanes were also used without further purification.

The method prepares FePt nanoparticles that self-assemble on surfaces into textured arrays in which the crystallographic axes of the particles are oriented with respect to the surface. This has not been achieved using the spherical FePt nanoparticles produced by the standard synthesis. This invention modifies the synthesis used by others to form spherical FePt nanoparticles by using dichlorobenzene as the solvent, heating the solution much more slowly and allowing the reaction to proceed at much lower temperatures and for longer times, with the goal of preparing nanoparticles that have cubic shapes that will self-orient their crystallographic axes during deposition on surfaces.

Figure 1:
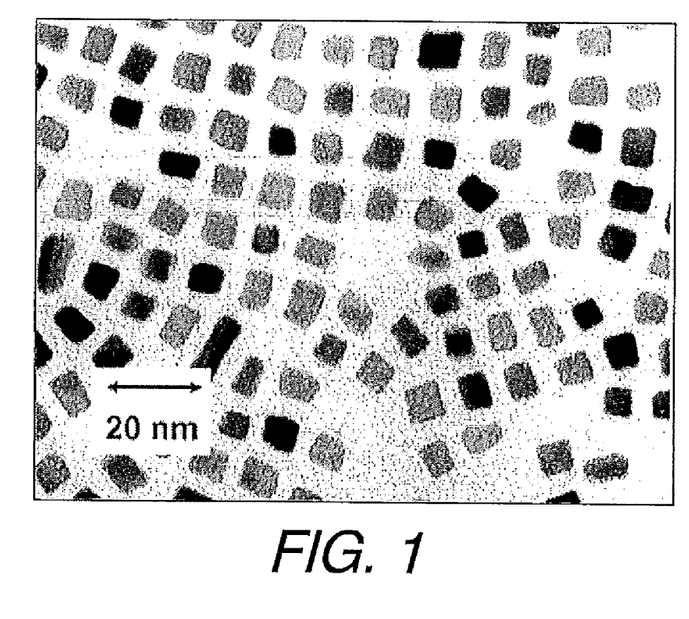
FIGS. 1 and 2 are bright-field TEM micrographs of unannealed FePt nanocubes.
Figure 2:
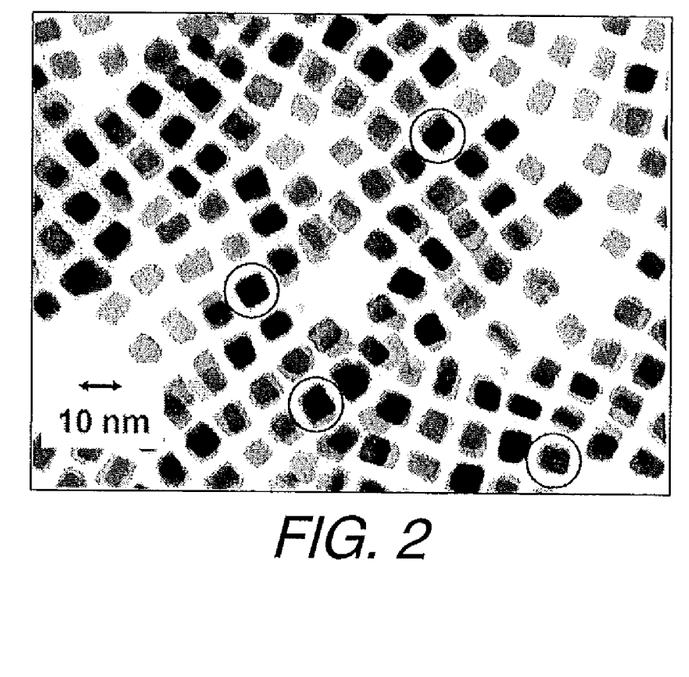

FIGS. 1 and 2 are bright-field TEM micrographs of unannealed FePt nanocubes deposited from a non-polar solvent on a carbon-coated copper TEM grid. The cubes are roughly 5 nm on a side. The particles in FIG. 1 form a monolayer. The particles in FIG. 2 that are marked in circles have formed a bilayer. The particles in the first and second layer of the bilayer have their sides aligned and one can observe an interference pattern between the two.

As revealed in the TEM images of FIGS. 1 and 2, the synthesis of this invention has successfully produced nanoparticles that are roughly cubic in shape with sides that are about 5 nm in length. Although the shapes and sizes of these particles are not yet uniform, their shapes clearly approximate those of cubes and rectangles more closely than those of spheres. Furthermore, the profiles of the nanoparticles on the TEM grid indicate that they have oriented themselves such that one face of the nanoparticles is in contact with the surface. In other words, if these particles are in fact crystalline and have, as one would expect, the fcc atomic structure of bulk FePt, then they are oriented with their [100] axes perpendicular to the surface.

Figure 3:
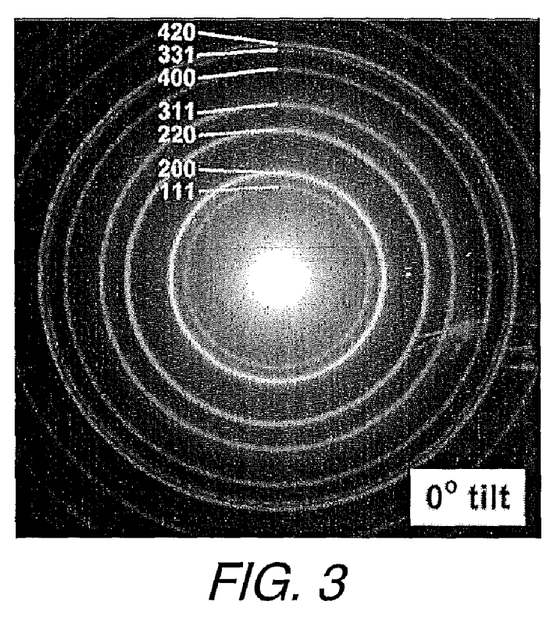
FIGS. 3 and 4 are selected area diffraction patterns of unannealed FePt nanocubes.
Figure 4:
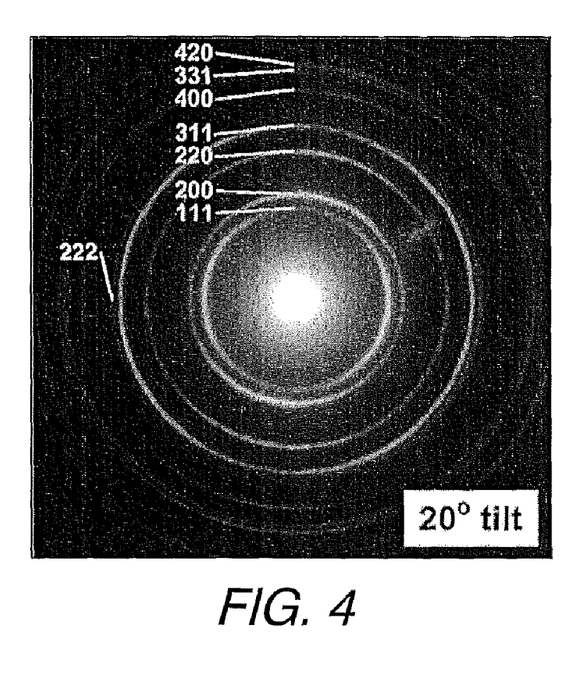

FIGS. 3 and 4 show selected area diffraction patterns of unannealed FePt nanocubes obtained with the TEM sample holder tilt angle set at 0° (FIG. 3) and 20° (FIG. 4). The intense diffraction from the (200) rings and weak diffraction from the (111) rings indicates a net [100] fiber texture. The anisotropy of the intensity in the rings observed in the diffraction patterns taken at a tilt of 20° also reveals texture in the nanoparticle orientation.

The crystallinity and crystallographic orientation of the FePt nanocubes are revealed by the selected area diffraction (SAD) patterns shown in FIGS. 3 and 4. The diffraction rings clearly arise from the fcc crystal structure of the FePt lattice. It is important to point out that for magnetic recording applications, one ultimately wants to produce the fct phase rather than the fcc phase. The important feature of the SAD patterns is that the intensities of the rings suggest that the particles have a net orientation with the [100] axes aligned along the surface normal. At 0° tilt this ought to yield intense diffraction from the [0kl] planes perpendicular to the [100] plane. The weak diffraction features from the [111] planes indicates that the order is imperfect. The electron diffraction patterns obtained at a sample tilt angle of 20° reveal anisotropy in intensity around the diffraction rings, also indicative of texture in the nanoparticle films. Similar diffraction features have been observed by others for textured films of sputter deposited FePt and CoPt films.

Close examination of FIG. 2 also reveals several features of the oriented FePt nanocubes. The features highlighted with circles appear to be two nanocubes stacked on top of one another. Close examination reveals interference patterns that arise from the superposition of the two lattices. These interference patterns appear in a number of such cases where two particles are stacked on top of one another. The orientation of these interference features indicates that the [100] planes are oriented parallel to the faces of the nanocubes.

Another interesting feature of the TEM images of FIGS. 1 and 2 is that locally the nanocubes assemble themselves into a square array. From the point of view of magnetic recording applications, this has the advantage of providing higher packing fraction than the assembly of spheres into close packed hexagonal lattices. The nanocubes assemble into a square array with a spacing between nanocubes of roughly 3-4 nm. The FePt nanocubes are coated with surfactant films formed by a mixture of oleic acid and oleylamine. The oleyl chain of these surfactants is roughly 2 nm in length and so the spacing between particles is consistent with expectations based on the dimensions of the surfactant chains.

Finally, the nanocube film imaged in FIG. 2 has a mixture of both monolayers and bilayers. The interesting feature of the film is that in the bilayer the nanocubes are stacked on top of one another. Furthermore, the sides of the nanocubes are aligned with one another, indicating that even in the second layer, the [010] and [001] axes retain the same orientation as in the first layer. This suggests that if allowed to assemble into a three-dimensional structure, these nanocubes could form a cubic lattice with a high degree of interparticle crystallographic alignment.

Figure 5:
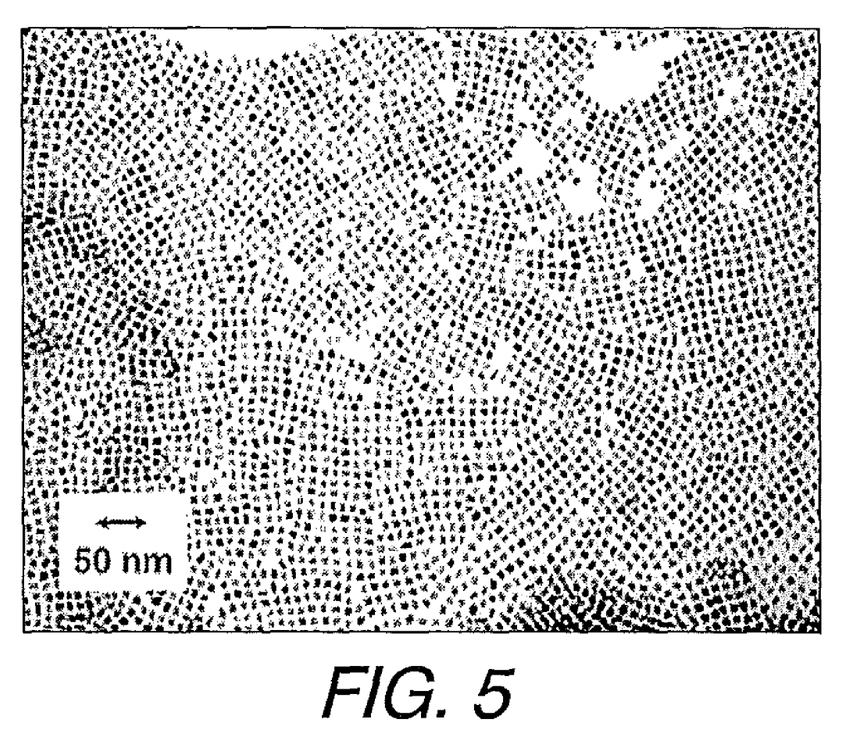
FIG. 5 is a bright-field TEM micrograph of unannealed FePt nanocubes self-assembled with local square arrays.

FIG. 5 is a bright-field TEM micrograph of unannealed FePt nanocubes self-assembled in local square arrays on a carbon-coated copper TEM grid. Monolayer and bilayer self-assembly is observed.

In order to be useful in magnetic recording applications, FePt nanocubes must be prepared as thin films with a fairly uniform distribution across large areas. Such films could be one or more layers in thickness. FIG. 5 shows a large area TEM image of a nanocube film formed by dip coating onto a TEM grid. As revealed by the image of FIG. 5, these nanocubes can be deposited with fairly uniform areal density across lengths on the order of 1 μm. Although the film does not display long range order, within the film, the nanocubes are ordered into a lattice that has domains with local square symmetry.

This invention addresses some of the challenges to the development of magnetic recording media based on FePt nanoparticles. By synthesizing FePt nanoparticles with roughly cubic shapes, the particles can be deposited on surfaces such that their crystallographic axes have net alignment with respect to the surface normal.

In the example described above, the invention provides a method that produces magnetic FePt nanocubes coated with surfactant. These nanocubes self-assemble on surfaces to form arrays with locally square symmetry. Within the array, the nanocubes are oriented with their [100] axes aligned along the surface normal. The [100] axes lying parallel to the surface are also aligned with one another. These properties have potential for application in high density magnetic recording and patterned media.

Figure 6:
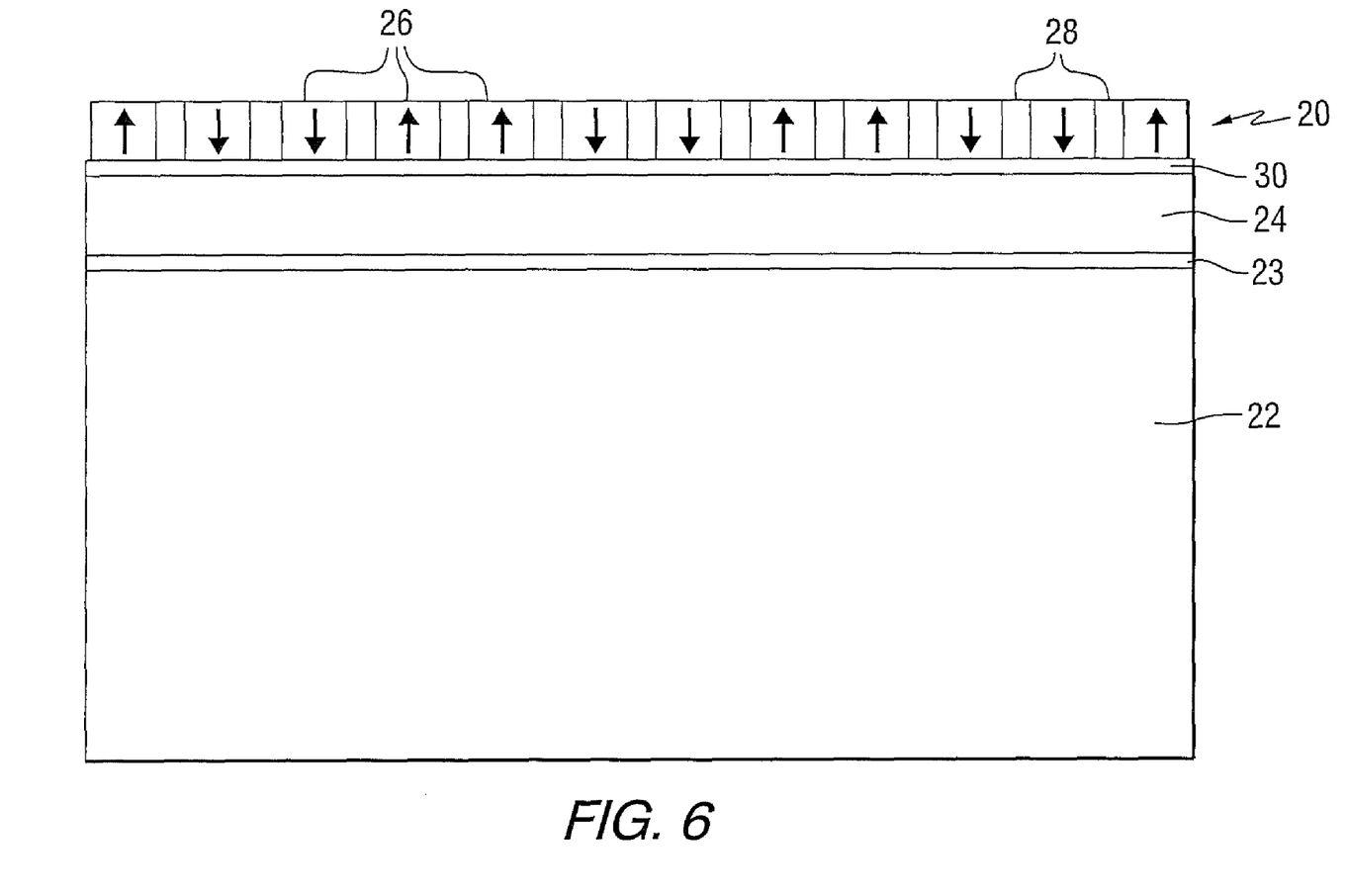
FIG. 6 is a cross-sectional view of a magnetic storage medium including cubic FePt nanoparticles.

In another aspect, the invention provides magnetic storage media including cubic FePt nanoparticles. FIG. 6 is a cross-sectional view of a magnetic storage medium 20 constructed in accordance with the invention. The storage medium includes a substrate 22, a magnetically soft underlayer 24, and a plurality of substantially cubic FePt nanoparticles 26 on the soft underlayer. The FePt nanoparticles 26 have easy axes of magnetization (indicated by arrows) that are substantially perpendicular to the plane of the soft underlayer and in the [100] direction of the cubic FePt nanoparticles. The FePt nanoparticles can be as small as 2 nm, while still maintaining magnetic anisotropy and thermal stability. In one example, the FePt nanoparticles have widths in the range of 4 nm to 10 nm. To reduce the possibility of a coalescence of the nanoparticles during annealing, a material such as an oxide 28 can be positioned between the nanoparticles.

FePt nanoparticles could be placed on top of a magnetically soft underlayer 24 (SUL) (for example, a FeCoB/Ru/FeCoB antiferromagnetically coupled structure). There is room for a thin interlayer 30, which is typically Ruthenium (Ru). For FePt nanoparticles, the interlayer can be MgO(001). Depending on how thin the surfactant coating is, there could be epitaxy between FePt and MgO(001) helping with the perpendicular alignment of the nanocubes.

In addition, there may be some $L1_0$ order in the as-made state, since the chemical synthesis proceeds at elevated temperature, where a fcc-fct phase transformation onset occurs. The SUL 24 is positioned on the substrate 22 that can be, for example, glass, AlMg, etc. An adhesion layer 23 can be, for example, Ti, Ta, etc. The SUL 24 can be, for example, 20-200 nm thick FeCoB, NiFe, CoZrNb, CoTaZr, etc. with or without an antiferromagnetic coupling layer of 0.5-5 nm Ru. The interlayer 30 can be, for example, Ru, MgO, Ta, etc.

FIG. 7 is a schematic representation of a lattice of spherical particles. FIG. 8 is a schematic representation of a lattice of cubic particles. FIGS. 7 and 8 also show the relevant $M_r t$ formulas.

Figure 9:
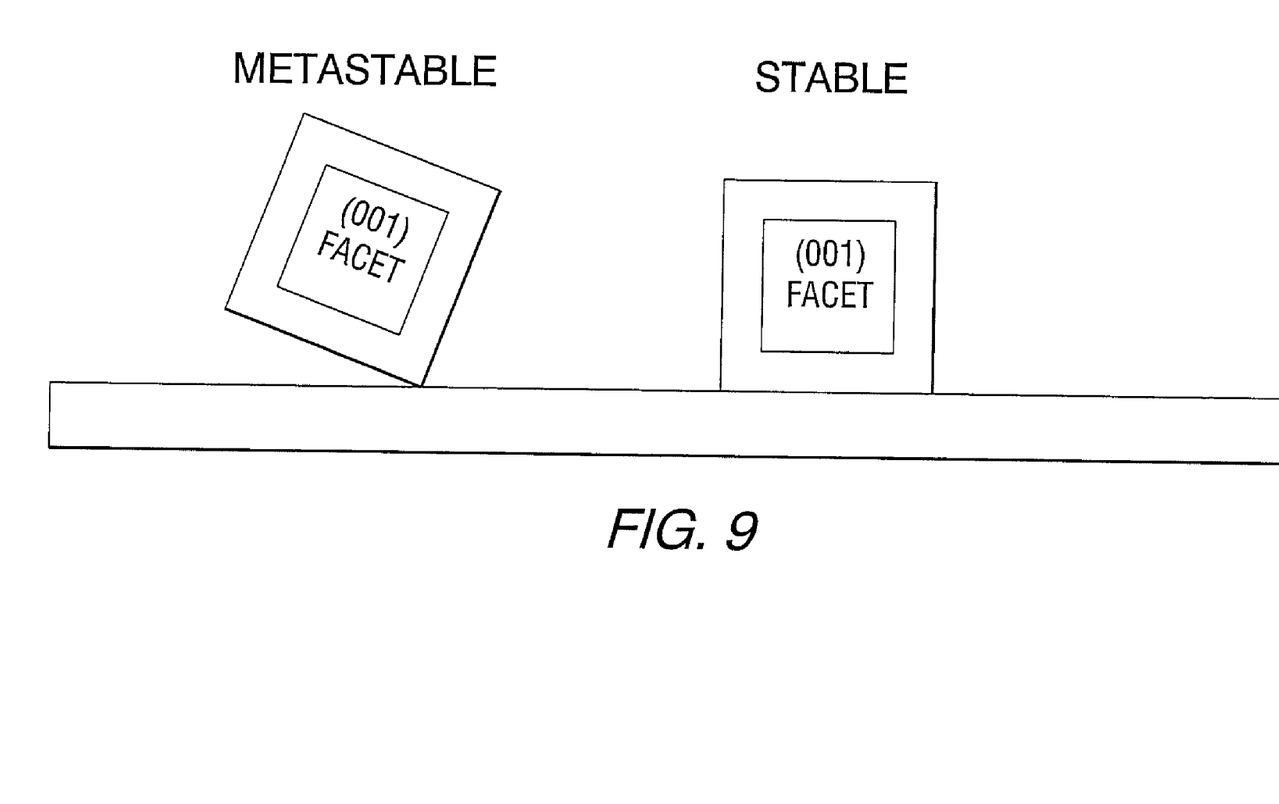
FIG. 9 is a schematic representation of particles in a metastable state and a stable state.
Figure 10:
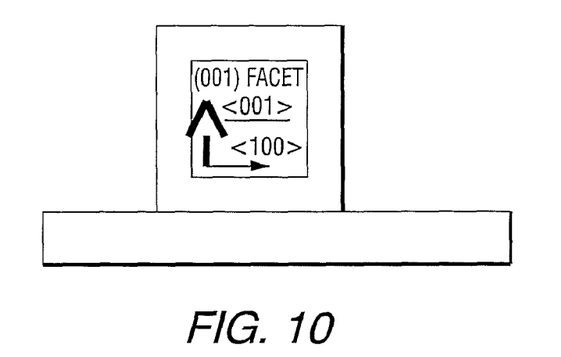
FIG. 10 is a schematic representation of a cubic particle with an $L1_0$ atomic structure in a magnetic field or biasing field.
Figure 11:
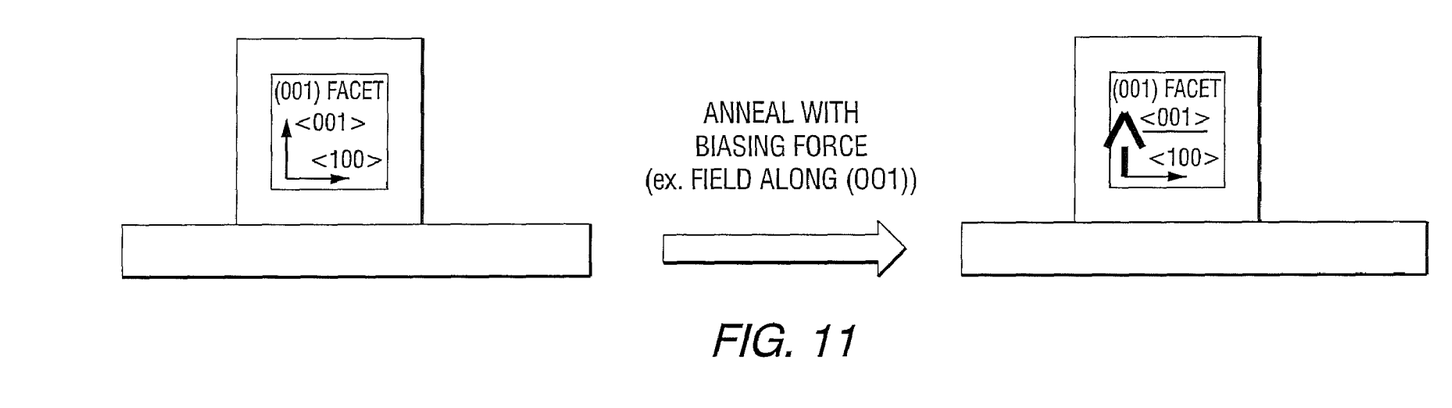
FIG. 11 is a schematic representation of a cubic particle with an fcc atomic structure followed by thermal annealing in a magnetic field or biasing field.

FIG. 9 is a schematic representation of a metastable nanoparticle and a stable nanoparticle. FIG. 10 is a schematic representation of an FePt nanoparticle that was $L1_0$ ordered before the self-assembly process. The bold dotted arrow marked as <001> indicates the tetragonality of the atomically ordered $L\overline{1_0 \text{ phase}}$. FIG. 11 is a schematic showing how an atomically disordered particle can be annealed to transform the particle into the tetragonal $L1_0$ structure. The particle on the left has <001> and <100> being similar directions that are related by the cubic atomic symmetry of the fcc disordered alloy. The particle on the right has been transformed to $L1_0$ by the annealing, and the unique easy axis of magnetization is indicated by the bold dotted arrow marked as <001>.

The medium can be annealed to produce a p$\overline{\text{hase transition}}$ in the FePt nanoparticles from fcc to fct. FIG. 11 illustrates a situation where FePt is assembled in the fcc disordered atomic phase. Therefore annealing is required to transform it into the high magnetocrystalline anisotropy phase (atomically ordered $L1_0$ crystal structure). This annealing can be performed in a magnetic field (or another appropriately oriented 'force') that is substantially perpendicular to the medium to maintain the easy axis of magnetization in the [001] direction of the cubic FePt nanoparticles.

It may also be possible to form the cubic nanoparticles in the required $L1_0$ atomically ordered state as shown in FIG. 10. If so, other 'forces' could be used to help orient the nanoparticle (for example, strain, electric field, etc. . . . ) during the self-assembly process to align the magnetic easy axes. The material between the magnetic cubes in FIG. 8 can be, for example a surfactant, an oxide, open space, a nonmagnetic metal, a weakly magnetic material, etc. to prevent agglomeration during annealing.

This description refers generally to cubic particles. However more specifically, the facets of the cube need to be parallel to the (100) atomic planes of the FePt. The faceting on the (100) planes can only be true if the particles are essentially single crystal and faceted on (100).

Figure 12:
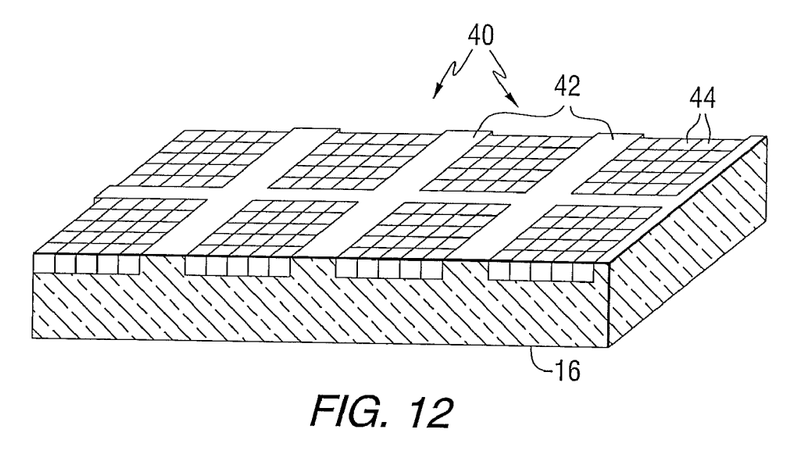
FIG. 12 is a perspective view of a section of a disc substrate with cubic nanoparticles self-assembled in a locking pattern.
Figure 13:
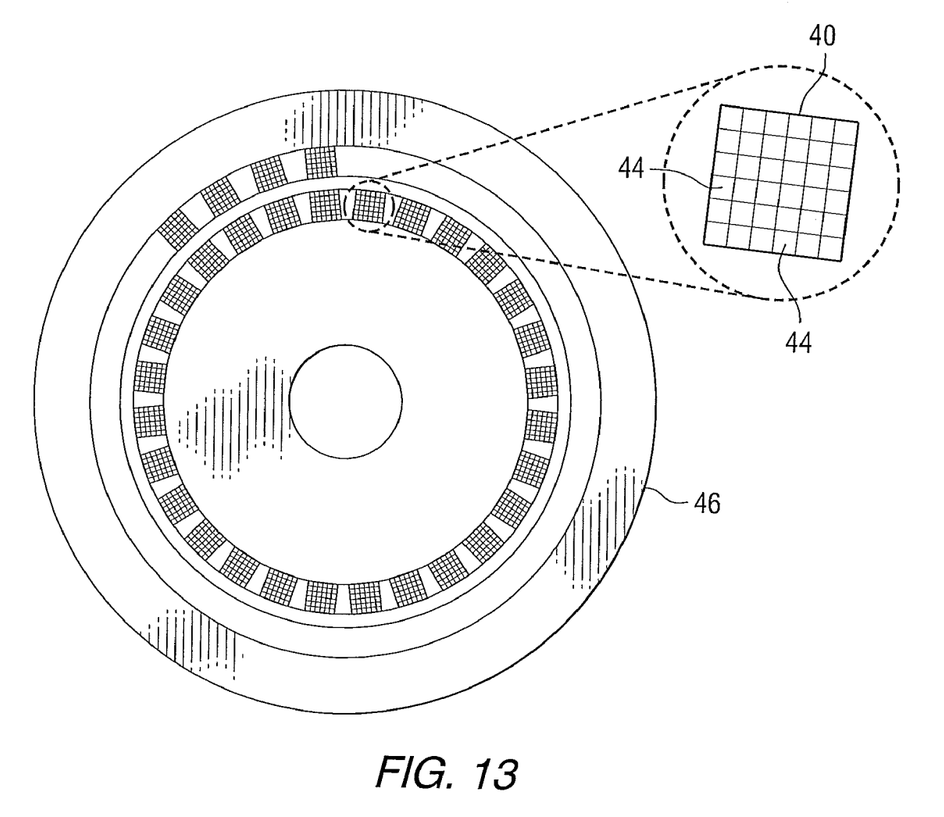
FIG. 13 is a top view of a magnetic recording disc illustrating the formation of magnetic arrays in a grooved locking pattern.

The nanoparticles can be assembled on a disc that includes a locking pattern. As shown in FIG. 12, the locking pattern includes a plurality of pits 40 and lands 42, with a pit depth ranging between 5 nm and 20 nm deep, depending upon the size the nanoparticles to be used in subsequent processing. Using a reactive ion etching process, the bottom surface of each pit forming the locking pattern will have a roughness (Ra) equal to approximately 0.4 to 0.5 nm. Cubic nanoparticles 44 are self-assembled in the pits. Various types of locking patterns may be utilized, including, but not limited to, the square pit pattern of FIG. 12 for a set of one or more bits, a groove pattern (see FIG. 13) for a set of one or more tracks on a disc 46, or islands in certain locations to create a coarse grid to stabilize the fine grid formed by the nanoparticles deposited in the locking pattern.

Additionally, the locking pattern may act as a servo pattern providing positioning information usable by a magnetic read/write head. Altering the sizes and shapes of the pits forming the locking pattern in accordance with a predefined servo pattern would enable the magnetic read/write head to determine its location on the surface of the magnetic recording disc.

While the invention has been described in terms of several examples, it will be apparent to those skilled in the art that various changes can be made to the described examples without departing from the scope of the invention as set forth in the following claims.

What is claimed is:

1. An apparatus comprising:
   a substrate;
   a magnetically soft underlayer on the substrate; and
   a plurality of generally cubic shaped FePt nanoparticles formed on the magnetically soft underlayer such that the FePt nanoparticles exhibit assembled local order, wherein the nanoparticles have a magnetization in a direction substantially normal to a surface of the magnetically soft underlayer.

2. The apparatus of claim 1, wherein:
   the FePt nanoparticles have a size in the range of 2 nm to 10 nm.

3. The apparatus of claim 1, further comprising:
   an oxide positioned between the nanoparticles.

4. The apparatus of claim 3, wherein the oxide comprises one of:
   $TiO_x$, $SiO_x$, $WO_x$, $NbO_x$, or $ZrO_x$.

5. The apparatus of claim 1, further comprising:
   a surfactant, open space, a nonmagnetic metal, or a weakly magnetic material positioned between the nanoparticles.

6. The apparatus of claim 1, further comprising:
   a mixture of oleic acid and oleylamine between the nanoparticles.

7. The apparatus of claim 1, wherein:
   the nanoparticles have an easy axis of magnetization in the [100] direction.

8. The apparatus of claim 1, wherein:
   the generally cubic shaped FePt nanoparticles have facets parallel to (001) crystalline planes and have [100] axes perpendicular to the surface of the magnetically soft underlayer.

9. The apparatus of claim 1, wherein:
   the generally cubic shaped FePt nanoparticles are arranged in a locking pattern.

10. The apparatus of claim 9, wherein the locking pattern includes a plurality of pits and lands, with a bottom surface of each pit having a roughness of about 0.4 to 0.5 nm.

11. The apparatus of claim 1, wherein the magnetically soft underlayer comprises:
    a FeCoB/Ru/FeCoB antiferromagnetically coupled structure.

12. The apparatus of claim 1, wherein the nanoparticles are arranged in a square array.

13. The apparatus of claim 1, wherein the nanoparticles are spaced about 3 to 4 nm apart.

14. The magnetic storage medium of claim 1, further comprising:
    an interlayer between the generally cubic shaped FePt nanoparticles and the magnetically soft underlayer.

15. The magnetic storage medium of claim 14, wherein the interlayer comprises one of:
    MgO, Ru or Ta.

16. The magnetic storage medium of claim 1, further comprising:
    an adhesion layer between the substrate and the magnetically soft underlayer.

17. The magnetic storage medium of claim 16, wherein the adhesion layer comprises one of:
    Ti or Ta.

18. A apparatus comprising:
    a plurality of generally cubic shaped FePt nanoparticles formed in a pattern exhibiting local order on a magnetically soft underlayer, wherein the generally cubic shaped FePt nanoparticles have facets parallel to (001) crystalline planes and have magnetically easy [100] axes perpendicular to the surface of the magnetically soft underlayer.

19. The apparatus of claim 18, wherein the magnetically soft underlayer comprises:
    an FeCoB/Ru/FeCoB antiferromagnetically coupled structure.

20. The apparatus of claim 18, further comprising:
    an MgO(001) interlayer between the generally cubic shaped FePt nanoparticles and the magnetically soft underlayer.

* * * * *

UNITED STATES PATENT AND TRADEMARK OFFICE
CERTIFICATE OF CORRECTION

PATENT NO. : 8,383,254 B2
APPLICATION NO. : 12/891838
DATED : February 26, 2013
INVENTOR(S) : Nisha Shukla et al.

Page 1 of 1

It is certified that error appears in the above-identified patent and that said Letters Patent is hereby corrected as shown below:

In the Claims

Column 8, line 30, Claim 12, "square anay." should read --square array.--.

Column 8, line 49, Claim 18, "exhibiting local" should read --exhibiting assembled local--.

Signed and Sealed this
Seventh Day of May, 2013

Teresa Stanek Rea
*Acting Director of the United States Patent and Trademark Office*